Patented July 24, 1934

1,967,655

UNITED STATES PATENT OFFICE 1,967,655

PROCESS FOR THE PRODUCTION OF ALKOXYALKYL ESTERS OF ORGANIC CARBOXYLIC AND SULPHONIC ACIDS

Heinrich Bertsch, Chemnitz, Germany, assignor to the firm H. Th. Böhme Aktiengesellschaft, Chemnitz, Germany, a corporation of Germany No Drawing. Application March 31, 1930, Serial No. 440,614. In Germany April 3, 1929

10 Claims. (Cl. 260—99.12)

It is known that the sulphonation products of the fats and oils as well as of their carboxylic acids possess emulsifying and wetting properties, for which reason they are employed in the form of Turkey red oils and allied preparations as wetting, penetrating and dispersing agents and the like.

According to this invention it has been found that these properties are in general possessed to a still greater degree by the alkoxyalkyl esters of the sulphonation products of the aromatic carboxylic acids and of the higher aliphatic mono-carboxylic acids and that these esters also possess other valuable properties, for example excellent foaming powers. They are, therefore, particularly suitable as foaming agents in the treatment of silk. The preparation of the aforesaid esters may be effected by employing the corresponding carboxylic-acids as starting material, sulphonating the same and introducing the corresponding ether of a polyhydroxy alcohol, for example glycol mono-ethyl ether, before, during or after the sulphonation. The sulphonation may be effected with the known sulphonating agents, concentrated sulphuric acid, oleum, sulphur trioxide or chlorsulphonic acid, the action being, if desired, assisted by suitable admixtures, particularly by water-removing inorganic or organic compounds, such as acid anhydrides or chlorides. Alternatively, the alkoxyalkyl carboxylic acid ester may be first prepared from the carboxylic acids by interaction with compounds of the type of the glycol mono-alkyl ethers and the said ester be then sulphonated.

Examples 1. 100 kgms. of ricinoleic acid are sulphonated at temperatures below 5° C. with 90 kgms. of 30% oleum. 30 kgms. of glycol mono-methyl ether are added to the crude sulphonation product. After completion of the reaction ice is added and the product washed with Glauber's salt solution. The products may be indicated by the following formula $$CH_3.(CH_2)_5CH.CH_2.CH=CH(CH_2)_7C\begin{smallmatrix}\diagup O\\\diagdown O.CH_2.CH_2OCH_3\end{smallmatrix}$$
$$\overset{|}{O.SO_3H}$$

2. 100 kgms. of 12-hydroxy stearic acid are mixed with 65 kgms. of glycol mono-ethyl ether and sulphonation effected at temperatures below 0° C. with 36 kgms. of chlorsulphonic acid. The product is worked up as in Example 1, and may be represented by the following formula

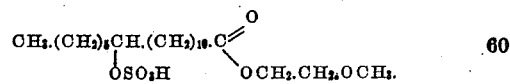

3. 100 kgms. of naphthoic acid are sulphonated with 70 kgms. of chlorsulphonic acid, 55 kgms. of glycol mono-methyl ether are added to the crude sulphonation product. In place of sulphuric acid and the like sulphonating agents alkyl sulphuric acids or alkyl chlorsulphonic acids may be employed. The compound obtained from the alkoxyalkyl ester of an aromatic carboxylic acid (for example the glycol mono-methyl ether ester of sulphonated β-naphthoic acid) may be represented as follows

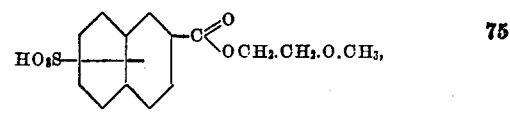

wherein the position of the sulpho group is uncertain.

The alkoxyalkyl esters prepared in the described manner may be with advantage employed as such, or in combination with sulphonated oils, aromatic sulphonic acids or their salts, hydrocarbons, halogen derivatives of hydrocarbons, alcohols, ketones etc., as wetting penetrating, foaming and dispersing agents in the most varied branches of the technique.

What I claim is:—

1. A process for preparing the alkoxyalkyl esters of organic mono-carboxylic acids, containing sulphuric acid radicals and having more than 8 carbon atoms, which comprises causing the said organic acids to react with sulphonating agents and with an ether of a polyhydroxy alcohol, said ether containing not more than 2 hydroxyl groups.

2. A process as claimed in claim 1, wherein the ether is added to the sulphonating agent.

3. A process as claimed in claim 1, wherein the organic acid is first esterified with the ether.

4. A process as claimed in claim 1, wherein sulphonation-promoting agents selected from the group consisting of anhydrides and acid chlorides of lower aliphatic acids are added to the reaction mixture.

5. A process as claimed in claim 1, wherein the ether is added to the sulphonating agent and wherein sulphonation-promoting agents selected from the group consisting of anhydrides and acid chlorides of lower aliphatic acids are added to the reaction mixture.

6. A process as claimed in claim 1, wherein the organic acid is first esterified with the ether and wherein sulphonation-promoting agents selected from the group consisting of anhydrides and acid chlorides of lower aliphatic acids are added to the reaction mixture.

7. A process for preparing an alkoxyalkyl ester of ricinoleic acid, which comprises reacting the acid with a sulphonating agent and with glycol mono-methyl ether at a temperature below 5° C.

8. A process for preparing an alkoxyalkyl ester of hydroxy-stearic acid, which comprises reacting the acid with a sulphonating agent and with glycol mono-ethyl ether at a temperature less than 0° C.

9. A process for preparing an alkoxyalkyl ester of naphthoic acid which comprises reacting the acid with glycol mono-methyl ether and a sulphonating agent.

10. The process defined in claim 1 in which the sulphonating agents are selected from the group consisting of alkyl sulphuric acids and alkyl chlorsulphonic acids.

HEINRICH BERTSCH.